March 22, 1949.   L. G. TUBBS   2,465,298
INDUCTION REGULATOR
Filed May 7, 1946
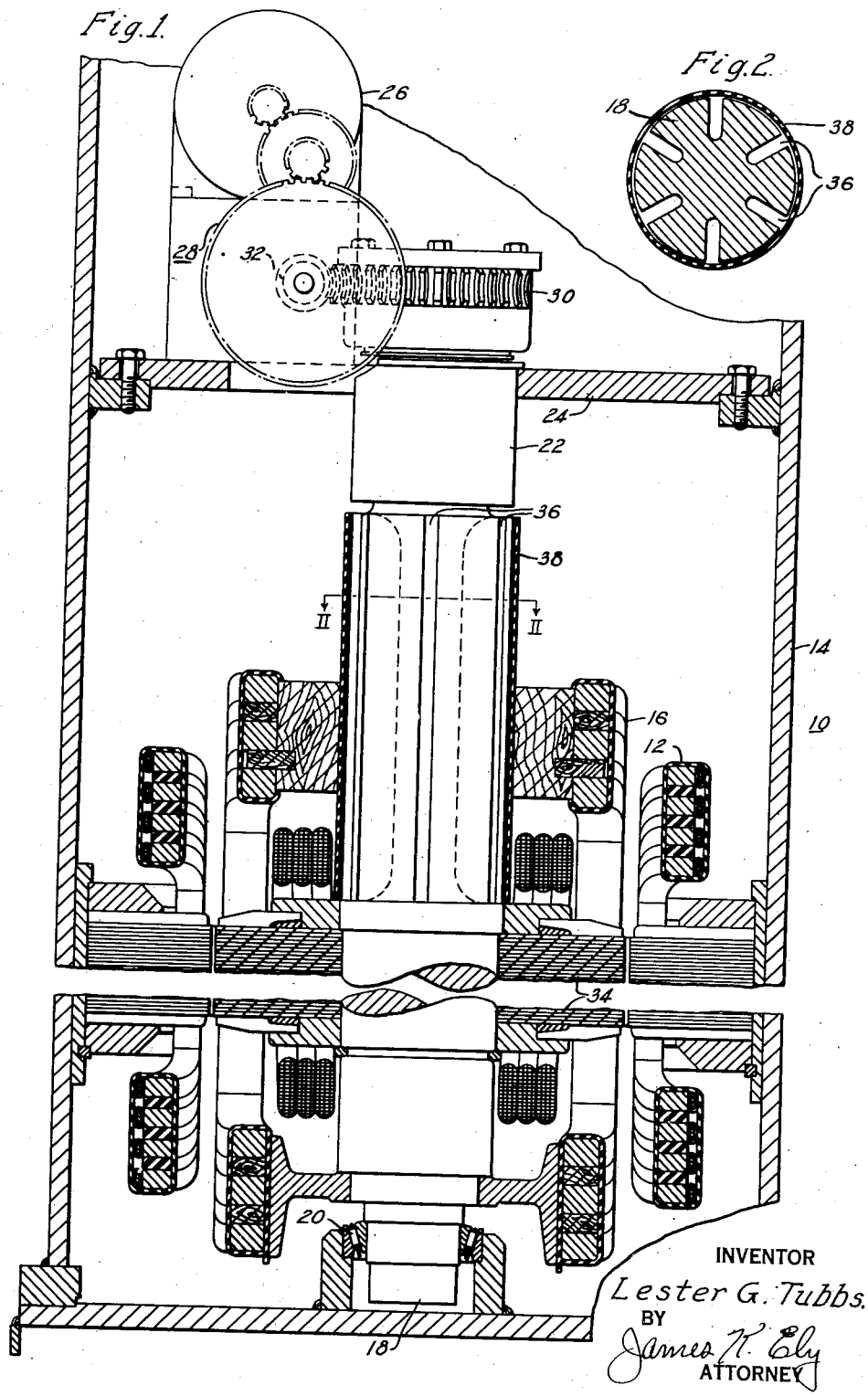
INVENTOR
Lester G. Tubbs.
BY
James N. Ely
ATTORNEY Patented Mar. 22, 1949

2,465,298

UNITED STATES PATENT OFFICE 2,465,298

INDUCTION REGULATOR

Lester G. Tubbs, Pittsburgh, Pa., assignor to Westinghouse Electric Corporation, East Pittsburgh, Pa., a corporation of Pennsylvania Application May 7, 1946, Serial No. 667,756

3 Claims. (Cl. 171—119)

This invention relates to induction regulators. Induction regulators are well known, having a stator and a rotor cooperating therewith and drive which usually embodies a gear drive for positioning the rotor with respect to the stator. In practice, for example with a single-phase induction regulator, there is developed a pulsating torque, such as two pulses of torque per cycle of applied power. This pulsating torque causes torsional vibration of the rotor and unless its resonant torsional frequency is below the frequency of the disturbing force, the vibration is transmitted to the gear drive to cause chattering of the gears of the drive.

Heretofore, attempts have been made to prevent chattering of the gear drive. Where successful solutions have been obtained, such as by the use of a compound flexible gear drive for positioning the rotor or by the use of a torsional spring between the gear drive and rotor, it is found that the regulators are enlarged somewhat as the added equipment requires additional space and at the same time adds greatly to the cost of the regulator.

An object of this invention is to provide an induction regulator having a flexible drive which will prevent chattering of the gears of the drive.

Another object of this invention is to provide an induction regulator having a flexible shaft for carrying the rotor without increasing the size of the regulator.

A further object of this invention is to provide an induction regulator having a fluted shaft for carrying the rotor for damping the torsional vibration of the rotor.

Other objects of this invention will become apparent from the following description when taken in conjunction with the accompanying drawing, in which:

Figure 1 is a vertical sectional view with parts broken away of an induction regulator embodying the teachings of this invention; and Fig. 2 is a view in section of a portion of the structure of Fig. 1 taken along the line II—II.

Referring to the drawing, this invention is illustrated as applied to an induction regulator 10. The regulator comprises a stator winding 12 suitably mounted within a tank 14 and a cooperating rotor winding 16 carried by a vertical shaft 18. The vertical shaft 18 is supported in operative position within the tank 14 by means of supporting bearings 20 and 22, the latter being carried by a horizontal strap or plate 24 disposed within or across the tank 14 near the upper end of the shaft 18. The stator winding 12 and the rotor winding 16 are usually immersed in oil or other suitable dielectric liquid (not shown) in the tank 14, which completely encloses the regulator windings.

A motor 26 is carried within the tank 14 below the cover (not shown) by the strap or plate 24 and is disposed to drive a train of gears 28 for actuating the vertical shaft 18 in a predetermined manner. As illustrated, the upper end of shaft 18 terminates above the strap or plate 24 and carries a worm gear segment 30, which is engaged by the cooperates with the worm 32 of the train of gears, the segment 30 being secured to the shaft in any suitable manner, such as by a key (not shown).

According to this invention, the portion or section of the shaft 18 extending upwardly from the laminations 34 of the rotor 16 is grooved lengthwise of the shaft to a point adjacent the upper bearing 22, the grooves 36 being substantially parallel to each other and substantially evenly spaced about the shaft to create, in effect, a fluted shaft. The size and number of the grooves 36 may vary somewhat, depending upon the flexibility it is desired to develop in the shaft 18 and the lateral stiffness it is desired to retain therein.

As a specific example of the fluted shaft in an induction regulator, reference may be had to a 3⅛ inch diameter shaft, 36½ inches long, adapted to carry a core for the rotor 15½ inches long, which is provided with a fluted section 8 3/16 inches long formed of six grooves ¼ inch wide and ¾ inch deep. Another shaft of the same diameter, 30 inches long, adapted to carry a rotor core 9 inches long, is provided with a fluted section formed of eight evenly spaced grooves ¼ inch wide and 1 inch deep. In both instances, the torsional flexibility is four to five times that of a solid shaft of the same size, while sufficient torsional strength and stiffness is retained to carry the rotor load and to withstand bending moments introduced therein.

In the embodiment illustrated, a sleeve 38 of suitable insulating material is disposed in spaced relation about the fluted section of the shaft 18 to insure that the shaft is physically insulated from the rotor windings, while at the same time aiding in the support of the rotor windings with respect to the shaft. Thus the fluted section of the shaft is free of physical contact with the windings or supporting structure for the windings of the rotor and the flexibility of the shaft is not impaired.

In operation, it is found that the torsional vibration of the rotor is efficiently absorbed by the fluted section of the shaft 18, which has sufficient torsional flexibility to prevent the transmittal of the torsional vibration of the rotor to the gear drive. Thus, chattering of the gears of the gear drive is prevented and a quiet operation of the regulator is obtained. These results are obtained without any increase in the size of the regulator.

I claim as my invention:

1. In an induction regulator, in combination, a stator, a rotor disposed in cooperative relation with the stator and subject to torsional vibration due to interaction of electrical forces between the rotor and stator when the windings thereof are energized even though the rotor is stationary, a gear drive for intermittently driving the rotor, and a shaft connected to the gear drive and disposed to carry the rotor mounted thereon, the shaft being fluted longitudinally over a portion thereof between the drive and the mounting for the rotor to render the shaft sufficiently flexible to prevent transmittal of the torsional vibration of the rotor to the gear drive, the shaft having a solid core throughout its length for retaining lateral stiffness and strength in the shaft.

2. In an induction regulator, in combination, a stator, a rotor subject to torsional vibration due to interaction of electrical forces between the rotor and stator when the windings thereof are energized even though the rotor is stationary, a gear drive for intermittently driving the rotor, a shaft connected to the gear drive and disposed to carry the rotor mounted thereon in cooperative relation with the stator, the shaft having a solid core throughout its length and a plurality of grooves disposed in spaced relation about its surface and extending longitudinally thereof a predetermined distance between the mounting of the rotor and the gear drive to render the shaft sufficiently flexible to prevent transmittal of the torsional vibration of the rotor to the gear drive.

3. In an induction regulator, in combination, a stator, a rotor subject to torsional vibration due to interaction of electrical forces between the rotor and stator when the windings thereof are energized even though the rotor is stationary, a gear drive for intermittently driving the rotor, a shaft connected to the gear drive and disposed to carry the rotor thereabout in cooperative relation with the stator, the shaft having a section fluted longitudinally thereof extending from within the rotor towards the gear drive to render the shaft sufficiently flexible to prevent transmittal of the torsional vibration of the rotor to the gear drive, the shaft having a solid core throughout its length for retaining lateral stiffness and strength, and a sleeve of insulating material disposed in spaced relation about the fluted section of the shaft and in supporting relation with the rotor disposed thereabout to insulate the fluted section from the rotor.

LESTER G. TUBBS.

REFERENCES CITED

The following references are of record in the file of this patent:

UNITED STATES PATENTS

| Number | Name | Date |
| --- | --- | --- |
| 1,709,695 | Tubbs | Apr. 16, 1929 |
| 1,796,623 | Rodgers | Mar. 17, 1931 |